(12) United States Patent
Golan et al.

(10) Patent No.: US 11,231,953 B2
(45) Date of Patent: Jan. 25, 2022

(54) MINIMIZING DOWNTIME WHEN IMPORTING VIRTUAL MACHINES FROM OTHER PLATFORMS

(71) Applicant: Red Hat, Inc., Raleigh, NC (US)

(72) Inventors: Roy Golan, Raanana (IL); Nir Soffer, Raanana (IL); Daniel Erez, Raanana (IL)

(73) Assignee: Red Hat, Inc., Raleigh, NC (US)

( * ) Notice: Subject to any disclaimer, the term of this patent is extended or adjusted under 35 U.S.C. 154(b) by 177 days.

(21) Appl. No.: 16/547,008

(22) Filed: Aug. 21, 2019

(65) Prior Publication Data

US 2021/0055946 A1 Feb. 25, 2021

(51) Int. Cl.
*G06F 9/455* (2018.01)

(52) U.S. Cl.
CPC .. *G06F 9/45558* (2013.01); *G06F 2009/4557* (2013.01); *G06F 2009/45562* (2013.01); *G06F 2009/45575* (2013.01); *G06F 2009/45579* (2013.01)

(58) Field of Classification Search
CPC ....... G06F 9/45558; G06F 2009/45562; G06F 2009/45579; G06F 2009/4557; G06F 2009/45575; G06F 8/63
See application file for complete search history.

(56) References Cited

U.S. PATENT DOCUMENTS

| | | | |
|---|---|---|---|
| 9,817,592 B1 | 11/2017 | Ratra et al. | |
| 2011/0208929 A1* | 8/2011 | McCann | G06F 3/0664 711/162 |
| 2014/0181015 A1* | 6/2014 | Bonzini | G06F 16/273 707/613 |
| 2015/0067390 A1* | 3/2015 | Blake | G06F 9/45558 714/15 |
| 2015/0135174 A1* | 5/2015 | Bonzini | G06F 9/45558 718/1 |
| 2018/0203719 A1* | 7/2018 | Zhang | G06F 8/447 |

FOREIGN PATENT DOCUMENTS

CN 108255570 A 7/2018

OTHER PUBLICATIONS https://web.archive.org/web/20161203021410/https://kashyapc.fedorapeople.org/virt/lc-2012/snapshots-handout.html; QCOW2 backing files and overlays; 2016 (Year: 2016).*

Palrao, "How to convert a VMware Virtual Machine to Hyper-V—Part I", Sep. 4, 2018, located at https://www.vembu.com/blog/how-to-convert-vmware-to-hyper-v-part-i/, downloaded on Jun. 20, 2019, 23 pages.

* cited by examiner

*Primary Examiner* — Dong U Kim
(74) *Attorney, Agent, or Firm* — Womble Bond Dickinson (US) LLP (57) ABSTRACT

Disclosed is a method, comprising obtaining configuration information for a virtual machine (VM) that is to be imported from a source platform to a target platform, creating an overlay image of a virtual disk image of the VM on an external disk, creating a second overlay image of the virtual disk image on a temporary disk of the target platform, the temporary disk comprising an active layer of the virtual disk image, and the external disk comprising a backing file of the temporary disk, starting a second VM on the target platform in view of the configuration information and copying, by a processing device, the temporary disk and the external disk to a target disk on the target platform.

20 Claims, 8 Drawing Sheets

MINIMIZING DOWNTIME WHEN IMPORTING VIRTUAL MACHINES FROM OTHER PLATFORMS

TECHNICAL FIELD

Aspects of the present disclosure relate to virtual machines (VMs), and more particularly, to migration of VMs.

BACKGROUND

VM migration refers to the process of moving a VM between different physical hosts. When importing a VM from an external platform, the virtual disks of the VM are copied to a target storage of the target platform. Once the copying is completed, the VM can be started on the target platform. Migration of VMs may provide advantages such as load balancing, modification of host hardware without disruption of services provided by the VM and energy saving among others.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

When migrating a VM from a source platform to a destination platform, the first step is copying the VM disks to storage on the target platform. When the copying is complete, the VM may begin running on the target platform. A VM disk (also referred to as a VM disk image) may include the operating system, application software and other data files for the VM. However, the time required to complete the copying of a VM disk may range from a number of minutes to a number of hours, depending on the size of the disk, the network bandwidth available and the source and destination platforms among other factors. As a result, a migration operation may involve a substantial amount of downtime during which the VM cannot be used. This down time may cause issues for data center users and administrators, particularly in scenarios that require quick mitigation such as disaster recovery, migrating to a new virtualization platform and converting VMs from foreign hypervisors (e.g., from VMware™ hypervisor to KVM hypervisor) etc.

The present disclosure addresses the above-noted and other deficiencies by using a processing device to obtain configuration information for a virtual machine (VM) that is to be imported from a source platform to a target platform. An overlay image of a virtual disk image of the VM is created on an external disk, which may be accessed for example using a path to a file in a file system storage, or a path to a logical volume in a network block disk. The virtual disk image may be in a quick emulation copy on write (QCOW2) or similar format which allows for the creation of overlay images from a base image. The processing device may create a second overlay image of the virtual disk image on a temporary disk of the target platform, the temporary disk comprising an active layer of the virtual disk image, and the external disk comprising a backing file of the temporary disk. A second VM may be started on the target platform in view of the configuration information, the second VM may immediately be used upon startup. When necessary, the second VM may write data to the temporary disk of the target platform. The processing device may copy the temporary disk and the external disk to a target disk on the target platform, at which point the second VM may be switched from using the temporary disk to using the target disk, and the VM migration may be complete.

Figure 1:
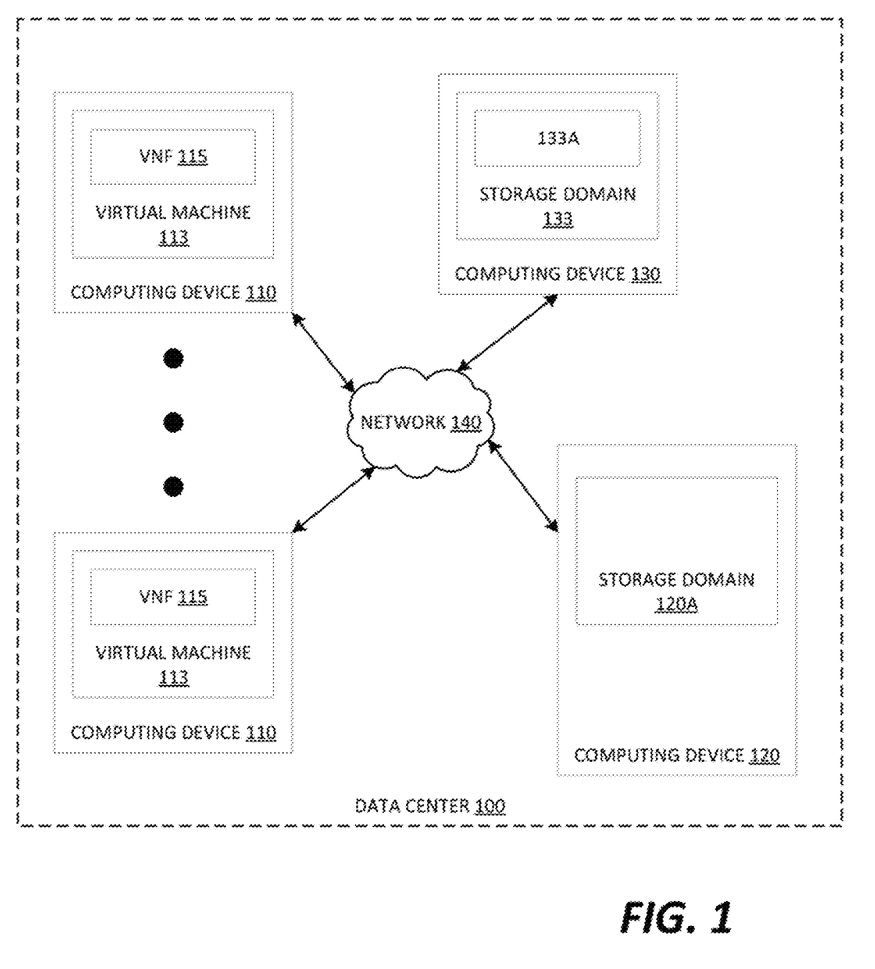
FIG. 1 is a block diagram that illustrates an example data center, in accordance with some embodiments of the present disclosure.

FIG. 1 is a block diagram that illustrates an example data center 100. As illustrated in FIG. 1, the data center 100 includes a plurality of computing devices 110, computing device 120 and a computing device 130. The computing devices 110, the computing device 120 and the computing device 130 may be coupled to each other (e.g., may be operatively coupled, communicatively coupled, may communicate data/messages with each other) via network 140. Network 140 may be a public network (e.g., the internet), a private network (e.g., a local area network (LAN) or wide area network (WAN)), or a combination thereof. In one embodiment, network 140 may include a wired or a wireless infrastructure, which may be provided by one or more wireless communications systems, such as a WiFi™ hotspot connected with the network 140 and/or a wireless carrier system that can be implemented using various data processing equipment, communication towers (e.g. cell towers), etc. The network 140 may carry communications (e.g., data, message, packets, frames, etc.) between computing devices 110, 120 and 130. Each computing device may include hardware such as processing devices (e.g., processors, central processing units (CPUs), memory (e.g., random access memory (RAM), storage devices (e.g., hard-disk drive (HDD), solid-state drive (SSD), etc.), and other hardware devices (e.g., sound card, video card, etc.).

Each computing device may comprise any suitable type of computing device or machine that has a programmable processor including, for example, server computers, desktop computers, laptop computers, tablet computers, smartphones, set-top boxes, etc. In some examples, each of the computing devices 110, 120 and 130 may comprise a single machine or may include multiple interconnected machines (e.g., multiple servers configured in a cluster). The computing devices 110, 120 and 130 may be implemented by a common entity/organization or may be implemented by different entities/organizations. For example, a first computing device 110 may be operated by a first company/corporation and a second computing device 110 may be operated by a second company/corporation. Each computing device 110, 120 and 130 may execute or include an operating system (OS), as discussed in more detail below. The OS of a computing device 110, 120 and 130 may manage the execution of other components (e.g., software, applications, etc.) and/or may manage access to the hardware (e.g., processors, memory, storage devices etc.) of the computing device.

Figure 2:
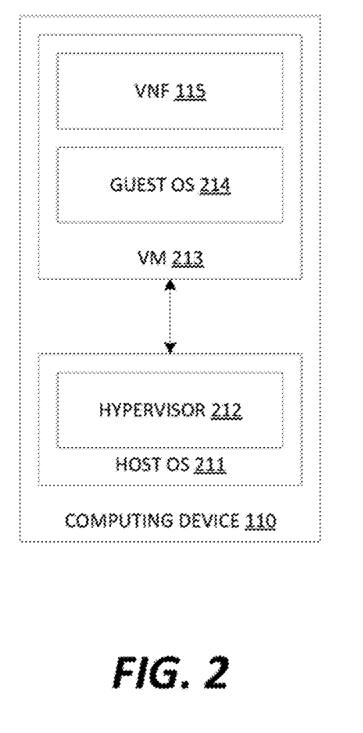
FIG. 2 is a block diagram that illustrates an example virtual machine executing within a computing device, in accordance with some embodiments of the present disclosure.

As illustrated in FIG. 1, each computing device 110 includes a virtual machine 113. In some embodiments, a virtual machine 113 may execute on a hypervisor (shown in FIG. 2A) which executes on top of the OS for a computing device, as discussed in more detail below. The hypervisor may manage system resources (including access to hardware devices, such as processors, memories, storage devices), as discussed in more detail below. The hypervisor may also emulate the hardware (or other physical resources) which may be used by the VMs to execute software/applications, as discussed in more detail below. Each VM 113 may be stored in any appropriate format, for example the Open Virtual Machine Format (OVF) which allows for a VM 113 to be exported from and imported to data centers in the same or different virtualization environment.

In some embodiments, a network virtualization platform such as the RedHat™ OpenStack™ platform, may also execute on the OS of a computing device. The network virtualization platform may use a consistent set of application programming interfaces (APIs) to abstract those virtual resources provided by the hypervisor one step further into discrete pools that may be used to configure and deploy a virtual machine (e.g., virtual machine 113) and any applications running thereon such as virtual network functions (VNFs) (e.g., VNF 115) that administrators and users may interact with directly. The network virtualization platform may include a deployment controller to handle creation of VMs as well as provisioning of such VMs with VNFs. The deployment controller may also function to manage the operations of the VNFs. For example, the network virtualization platform may utilize the deployment controller to create virtual switches (and a virtual environment for the switch to run on) as well as manage the operations of the virtual switch (e.g., configuring/modifying rules and groups, managing connections with other VNFs and handling diagnostic tasks).

As further illustrated in FIG. 1, each VM 113 includes a VNF 115. Although one VNF 115 is illustrated in a respective VM 113, a VM 113 may include multiple VNFs 115 in other embodiments. VNFs 115 may be deployed and managed by a deployment controller (not illustrated in the figures) executing as part of a network virtualization platform.

Each virtual machine 113 may include a runtime environment (not illustrated in the figures). A runtime environment may refer to a configuration of hardware and/or software that supports the execution of different types of applications which may be written in different programming languages. Different runtime environments may allow/use different programming languages and/or different versions of programming languages. The runtime environments for the virtual machines 113 may be different. In one embodiment, a first runtime environment may use a different programing language than a second runtime environment. For example, a first runtime environment may use JavaScript and a second runtime environment may use Python. In another embodiment, a first runtime environment may use a different version of a programming language than a second runtime environment. For example, a first runtime environment may use JavaScript version 5.1 and a second runtime environment may use JavaScript version 6. In a further embodiment, a first runtime environment may use different libraries and/or different version of libraries than a second runtime environment. For example, a first runtime environment may use AngularJS (e.g., a JavaScript based library) and a second runtime environment may use React (a different JavaScript based library). In another example, a first runtime environment may use AngularJS version 1.5 and a second runtime environment may use AngularJS version 4.

FIG. 2 is a block diagram that illustrates an example VM 113 executing within a computing device 110, in accordance with some embodiments of the present disclosure. The computing device 110 may include hardware (e.g., processing devices, memory, storage devices, other devices, etc.) and a host OS 211. In one embodiment, the VM 113 may be a software implementation of a machine (e.g., a software implementation of a computing device) that includes its own operating system (referred to as guest OS 214) and executes application programs, applications, and software such as VNF 115. VM 113 may be, for example, a hardware emulation, a full virtualization, a para-virtualization, and an operating system-level virtualization VM.

Computing device 110 may include a hypervisor 212, which may also be known as a virtual machine monitor (VMM). In the example shown, hypervisor 212 may be a component of a host operating system (OS) 211. In another example, hypervisor 212 may run on top of the host operating system 211, or may run directly on host hardware without the use of a host operating system 211. Hypervisor 212 may manage system resources, including access to physical processing devices (e.g., processors, CPUs, etc.), physical memory (e.g., RAM), storage device (e.g., HDDs, SSDs), and/or other devices (e.g., sound cards, video cards, etc.). The hypervisor 212, though typically implemented in software, may emulate and export a bare machine interface to higher level software in the form of virtual processors and guest memory. Higher level software may comprise a standard or real-time operating system (OS), may be a highly stripped down operating environment with limited operating system functionality, and/or may not include traditional OS facilities, etc. For example, higher level software may be a network virtualization platform such as RedHat™ OpenStack™, as discussed above. Hypervisor 212 may present other software (i.e., "guest" software) the abstraction of one or more virtual machines (VMs) that provide the same or different abstractions to various guest software (e.g., guest operating system, guest applications).

VM 113 may execute guest software that uses an underlying emulation of the physical resources (e.g., virtual processors and guest memory). As illustrated in FIG. 2, VM 113 may execute a VNF 115 (e.g., a component/part of a larger network), such as a virtual switch, within a runtime environment (not shown in the figures). Both the VM 113 and the VNF 115 may be configured and deployed by a network virtualization platform executing atop the host OS 211, as discussed above. The network virtualization platform, via the computing device 110 may provide administrators and users with the capability to virtualize a variety of network functions.

Figure 3A:
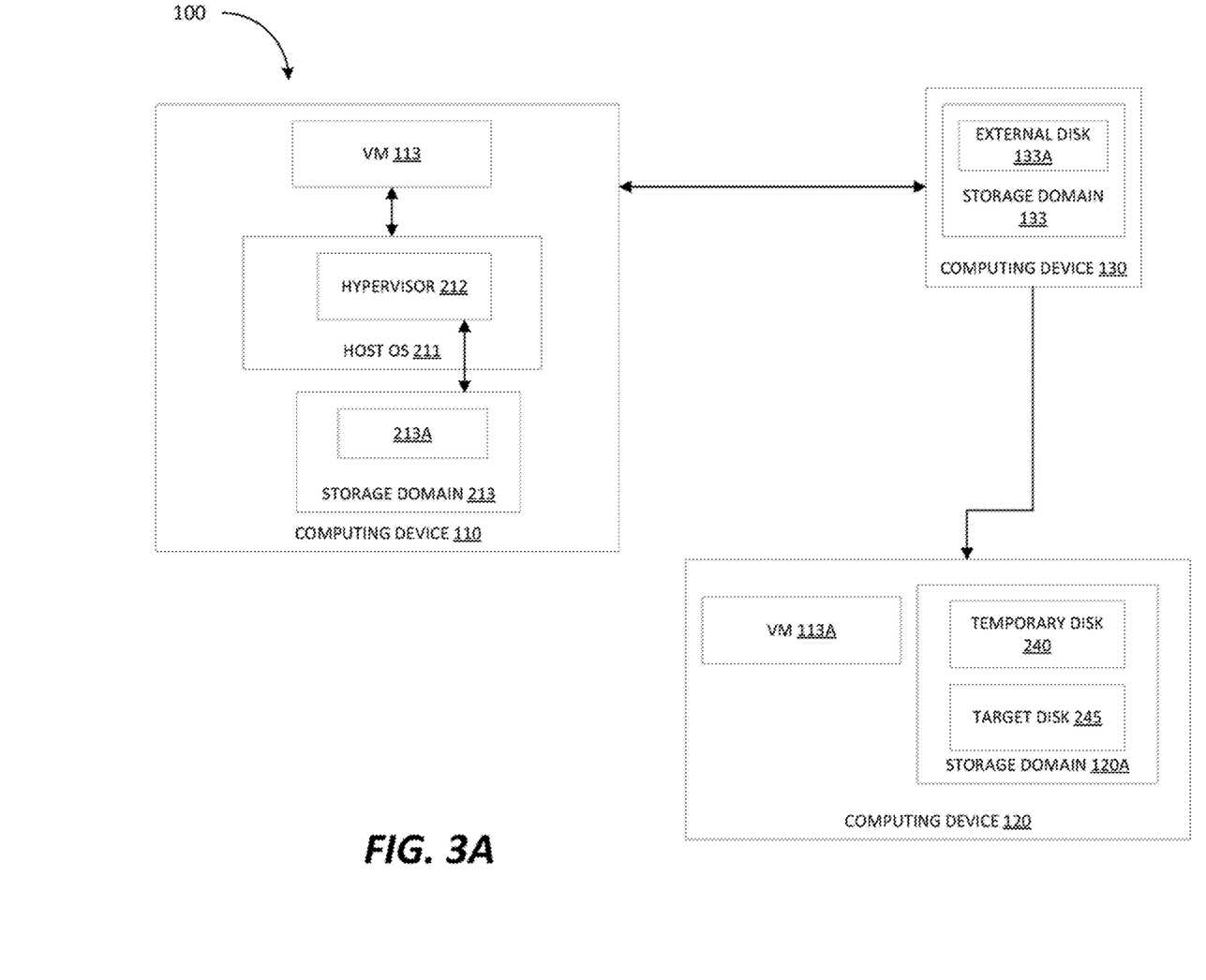
FIG. 3A is a block diagram that illustrates a simplified data center, in accordance with some embodiments of the present disclosure.

FIG. 3A illustrates a simplified block diagram of data center 100. A user may wish to migrate VM 113 executing on computing device 110 to computing device 120. Such a migration may be performed for load balancing, modification of host hardware and/or energy saving purposes among others. The operating system, application software and other data files for VM 113 may be stored on virtual disk image (VDI) 213A, located on storage domain 213. Although illustrated as part of the computing device 110, storage domain 213 may be implemented on a separate physical device (e.g., separate computing device). Storage domain 213 may hide the specifics of the physical storage device and provide a uniform model for storing data/files of VMs including log files, scripts, configuration files and virtual disks etc. When VM 113 communicates with VIM 213A it may issue internet small computer system interface (iSCSI) commands, for example. Because a storage domain can exist on different types of physical storage, these commands may be encapsulated into other forms, depending on the protocol that the hypervisor 212 (e.g., the virtualization host) uses to connect to the physical storage device in which the storage domain is implemented. Examples of such protocols may include network file system (NFS), GlusterFS exports, other portable operating system interface (POSIX) compliant file systems, internet small computer system interface (iSCSI), local storage attached directly to the virtualization hosts, fiber channel protocol (FCP), parallel NFS (pNFS) or any other appropriate protocol.

VDI 213A may be in any appropriate format, including for example quick emulation copy on write (QCOW2) or RAW. QCOW2 allows for the creation of a base-image (VDI 213A in the example of FIG. 3A) as well as several 'disposable' copy-on-write (COW) overlay disk images on top of the base image. When an overlay image of VDI 213A is created, computing device 110 may save the state of the VM 113 and the saved state will be stored in one file (e.g., VIM 213A which is now a read-only backing file) and a new file (the overlay image) may act as the active layer and track the changes from that saved state. The overlay image may point to VDI 213A as the backing file and may be created on a virtual disk on the same physical device as the VDI 213A or a different physical device as discussed in further detail herein. Any appropriate number of overlay images may be created, with each overlay image created acting as the new active layer and the overlay image that was previously the active layer acting as a new backing file. In this way, a "backing chain" may be created comprising the current active layer and all backing files of VDI 213A (including VDI 213A itself). Different parts of a backing chain (e.g., backing files and active layer) may be located on different physical devices as discussed in further detail herein. Backing files and overlays may allow for rapid instantiation of thin-provisioned VMs. Backing files may be opened read-only. Stated differently, once an overlay is created, its backing file should not be modified (as the overlay depends on a particular state of the backing file). Thus, each overlay may represent changes made to an underlying base disk image. In the example of FIG. 3A, VDI 213A is in the QCOW2 format.

Continuing to refer to FIG. 3A, in some embodiments, the computing device 130 may include a storage domain 133. In some embodiments, computing device 130 may be a network block device (NBD) server and the storage domain 133 may comprise a block device storage system. In a block device storage system, block devices may be aggregated into a logical entity called a volume group, and then divided by Logical Volume Manager (LVM) into logical volumes for use as virtual disks. Each virtual disk or overlay may be a logical volume. For example, storage domain 133 may comprise a storage area network (SAN) that can communicate with hypervisor 212 via iSCSI or FCP. In other embodiments, computing device 130 may be a file system server (e.g., NFS server) and the storage domain 133 may comprise any portable operating system interface (POSIX) compliant file system in which all virtual disks and overlays are files. Storage domain 133 may communicate with hypervisor 212 via NAS-NFS, GlusterFS exports or the protocol of any other appropriate file system that storage domain 133 is implemented with.

Computing device 120 may be the target platform to which VM 113 is to be imported. When computing device 120 wishes to migrate (import) VM 113 from computing device 110, it may execute VM migration module 127A (illustrated in FIG. 3B) to perform the functions described herein to perform migration of the VM 113 with minimal downtime. Computing device 120 may include storage domain 120A which may comprise a block device or a file system based storage system as discussed herein with respect to storage domain 133. Computing device 120 may create temporary disk 240 on storage domain 120A. Temporary disk 240 may be a virtual disk that is empty upon its creation and may act as a placeholder for use by a VM in reading and/or writing data, as discussed in further detail herein.

Figure 3B:
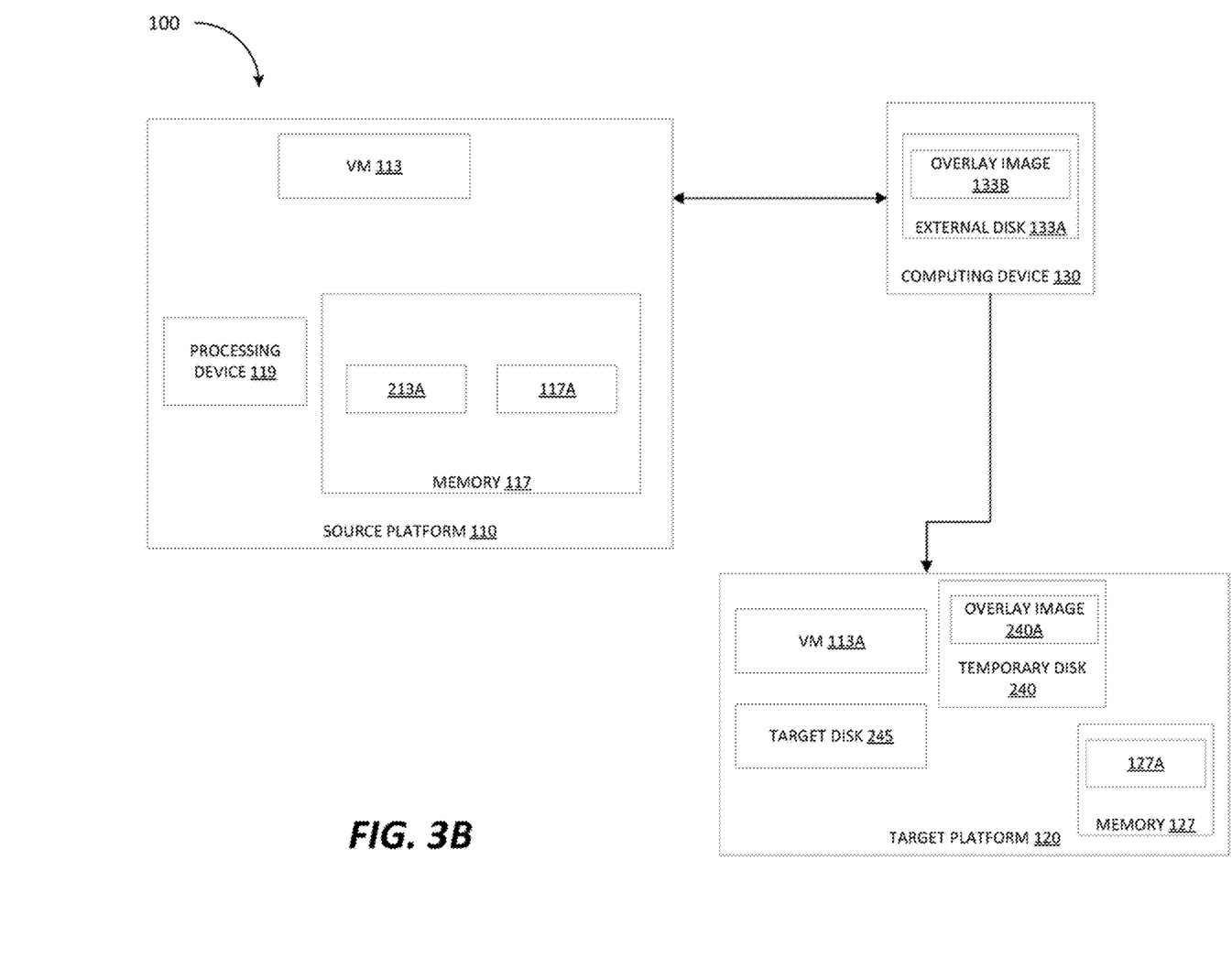
FIG. 3B is a block diagram that illustrates a simplified data center, in accordance with some embodiments of the present disclosure.

Computing device 120 may issue a request to migrate VM 113 to computing device 110 and obtain configuration information for the VM 113. As discussed herein, VM 113 may be stored in the Open Virtual Machine Format (OVF) which allows for the VM 113 to be exported from and imported to data centers in the same or different virtualization environment. When a VM 113 is exported as an OVF file, a directory is created that contains an OVF file and the virtual disk files of the VM 113 (the configuration information). An OVF file may allow a computing device (e.g., computing device 120) to understand the purpose and functions of VM 113 and create a new instance of VM 113.

Referring to both FIGS. 3A and 3B, external disk 133A may be a virtual disk in storage domain 133 that is accessed by hypervisor 212 externally and may connect to hypervisor 212 in any appropriate manner (e.g., iSCSI if storage domain 133 is a SAN). In some embodiments, processing device 119 may execute VM migration module 117A to perform one or more of the functions described herein. Responsive to a request from computing device 120 to migrate VM 113 thereto, computing device 110 may transmit the configuration information of VM 113 to computing device 120 and stop execution of the VM 113. Computing device 110 may create (e.g., using the qemu-img tool) an overlay image 133B of VDI 213A on external disk 133A. As discussed above, the overlay image 133B may be the next link in the backing chain of VDI 213A and may be created on the external disk 133A located in the storage domain 133 on computing device 130. QCOW2 supports creation of overlay images in a variety of ways. For example, if storage domain 133 is a block device based storage (with computing device 130 being e.g., an NBD server), computing device 110 may create the overlay image 133B, and export it as a read only device to computing device 130 using for example the qemu-nbd command and specifying the URL of the path to the logical volume of storage domain 133 where external disk 133A is located. Depending on how storage domain 133 is implemented, the external disk 133A may be identified by a path of a file in a file system or a logical volume of a block device system in any appropriate manner as discussed herein. In some embodiments, external disk 133A may be located on a local storage domain attached directly to hypervisor 212 (e.g. storage domain 213).

Once the overlay image has been exported to the external disk 133A, the external disk 133A may include all of the data of the VDI 213A but may be read from as well. Computing device 130 may create (e.g., using the qemu-img tool) a second overlay image 240A on temporary disk 240 in storage domain 120A. The second overlay image 240A may point to external disk 133A as the backing file for temporary disk 240 and the temporary disk 240 may become the active layer of external disk 133A. The second overlay image 240A may be created on temporary disk 240 as discussed above with respect to the first overlay image (e.g., may be exported to storage domain 120A of computing device 120 using the qemu-nbd command by specifying a URL of the path to the logical volume or file in storage domain 120A where temporary disk 240 is located).

In some embodiments, computing device 120 may execute VM migration module 127A in order to perform the functions described herein. Computing device 120 may use the configuration information of the VM 113 obtained from computing device 110 to create a new VM 113A which is a copy of VM 113 and begin running VM 113A using temporary disk 240. When the VM 113A needs to read or write data, it may utilize temporary disk 240 (the active layer) created in the storage domain 120A of computing device 120. VM 113A may communicate with temporary disk 240 in the same manner that VM 113 communicates with VDI 213A as discussed above. VM 113A may run with a limited set of data because the data in external disk 133A has not yet been copied to computing device 120. Thus, if the VM 113A requests to read data that is not stored on the temporary disk 240, VM 113A may read that data from external disk 133A on computing device 130. In addition, if the data is not on the external disk 133A, it may be read from VDI 213A.

Once the VM 113A has begun running, computing device 120 may initiate a storage migration process to fully migrate external disk 133A (including the operating system, application software and other data files of VM 113) and the temporary disk 240 to the target disk 245 of computing device 120 for use by VM 113A. For example, computing device 120 may use live storage migration, in which virtual machine disks can be migrated from one storage domain to another while the virtual machine to which they are attached (in the example of FIG. 3A, VM 113A) is running. When a disk attached to a running virtual machine is migrated, a snapshot of that disk's backing chain is created in the source storage domain (in this case storage domain 133), and the entire backing chain is replicated in the destination storage domain (in this case, target disk 245 in storage domain 120A). Thus, the VM 113A may remain active and user applications may continue to run thereon while external disk 133A and the temporary disk 240 are migrated to the target disk 245 on computing device 120 (the new physical host) for use by VM 113A. Computing device 120 may perform this live migration in the background during operation of VM 113A.

Using live migration, during copying of external disk 133A, disk reads and writes by VM 113A are made on the temporary disk 240. While these read and write operations are occurring, the contents of external disk 133A are copied to target disk 245 as a background operation. Simultaneously, the contents of temporary disk 240 are copied to the target disk 245. Once the copy process is complete for both the temporary disk 240 and the external disk 133A, computing device 120 may mirror outstanding write operations to both the temporary disk 240 and the target disk 245. Stated differently, write operations performed by VM 113A after the copying may be written to both the temporary disk 240 and the target disk 245, as this allows any outstanding write operations to be completed. After the temporary disk 240 and the target disk 245 are synchronized, the VM 113A may be switched over from the temporary disk 240 to use the target disk 245, and the external disk 133A may be deleted.

In some embodiments, because live storage migration may only occur between two file-based domains (NFS, POSIX, and GlusterFS) or between two block-based domains (FCP and iSCSI), computing device 120 may convert the format of the external disk 133A to the format of the target disk 245 using any appropriate tools. For example, if the external disk 133A is in a QCOW2 format and the target disk 245 is in a RAW format, computing device 120 may convert the external disk 133A to the RAW format.

Figure 3C:
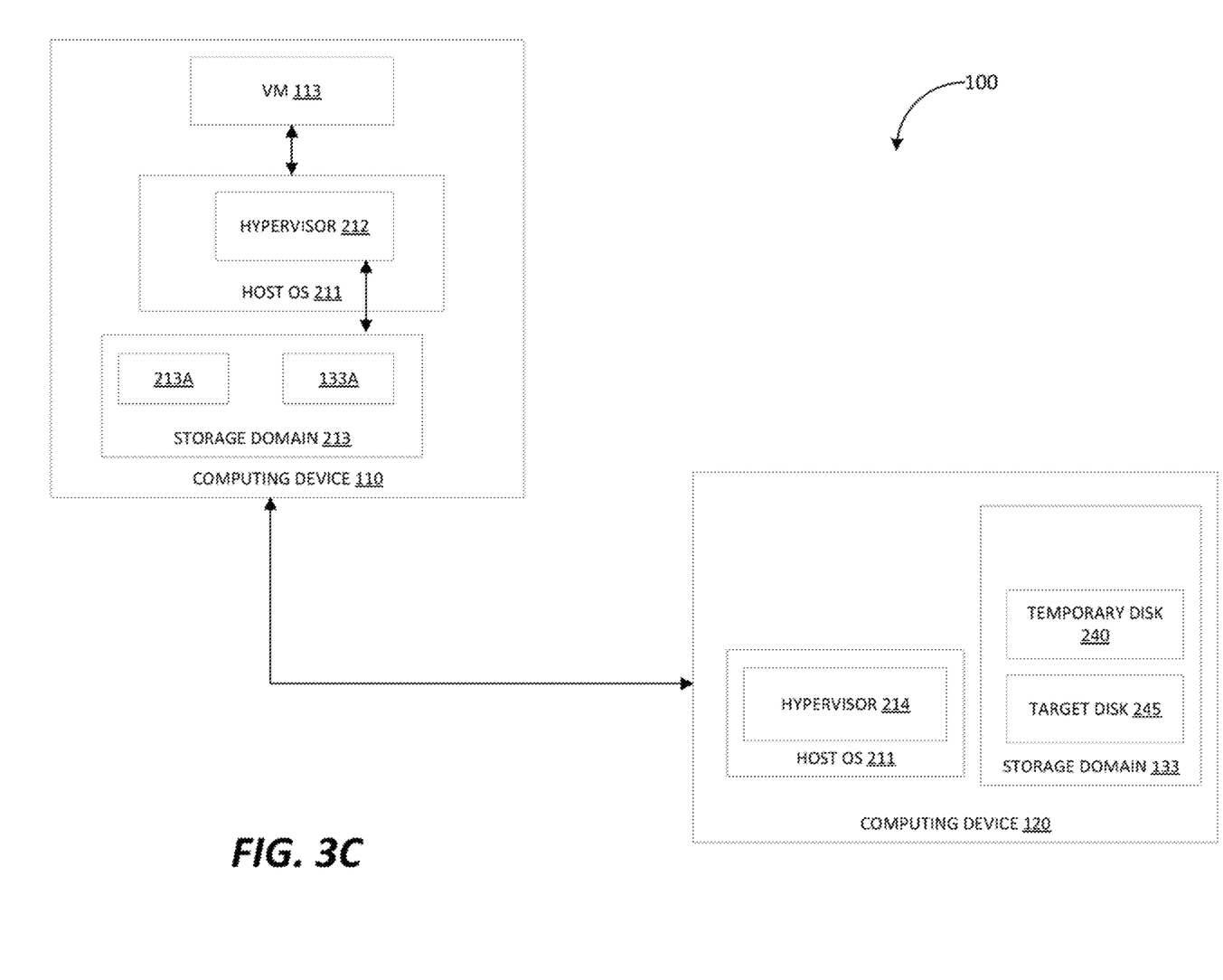
FIG. 3C is a block diagram that illustrates a simplified data center, in accordance with some embodiments of the present disclosure.

FIG. 3C illustrates a simplified diagram of the data center 100 with the external disk 133A being located on a local storage domain attached directly to hypervisor 212 (e.g. storage domain 213) on computing device 110. In some embodiments, hypervisor 212 on which VM 113 runs may be a foreign hypervisor (e.g., VMware™ hypervisor) that is different from hypervisor 214 (e.g., KVM hypervisor) on computing device 120. In such a case, when a request to migrate a VM 113 is received, the VM 113 from foreign hypervisor 212 may be converted to run on hypervisor 214 of computing device 120. Computing device 120 may use any appropriate tool such as virt-v2v to convert foreign VMs including their disk images and metadata for use with hypervisor 214 on any appropriate system (e.g., Red Hat™ Enterprise Linux™ operating system with KVM hypervisor, Red Hat™ Virtualization environment, and Red Hat™ OpenStack™ Platform). In this manner, computing device 120 can read Linux and Windows guest VMs running on a VMware™ hypervisor, Xen™ hypervisor, Hyper-V™ hypervisor or any other appropriate hypervisor, and convert them to VMs of hypervisor 214 of computing device 120 (e.g., KVM hypervisor). During the conversion process, computing device 120 may convert the guest disks and metadata into a local temporary directory which may act as the external disk 133A. Stated differently, for each guest disk, an overlay is stored temporarily that stores the changes made during conversion, and is used as a cache. For example, the temporary overlay may be written to external disk 133A which in the example of FIG. 3B, is a virtual disk on storage domain 213.

Computing devices 110 and 120 may then perform the operations described above with respect to FIG. 3A to migrate the VM 113 to computing device 120 successfully.

Figure 4:
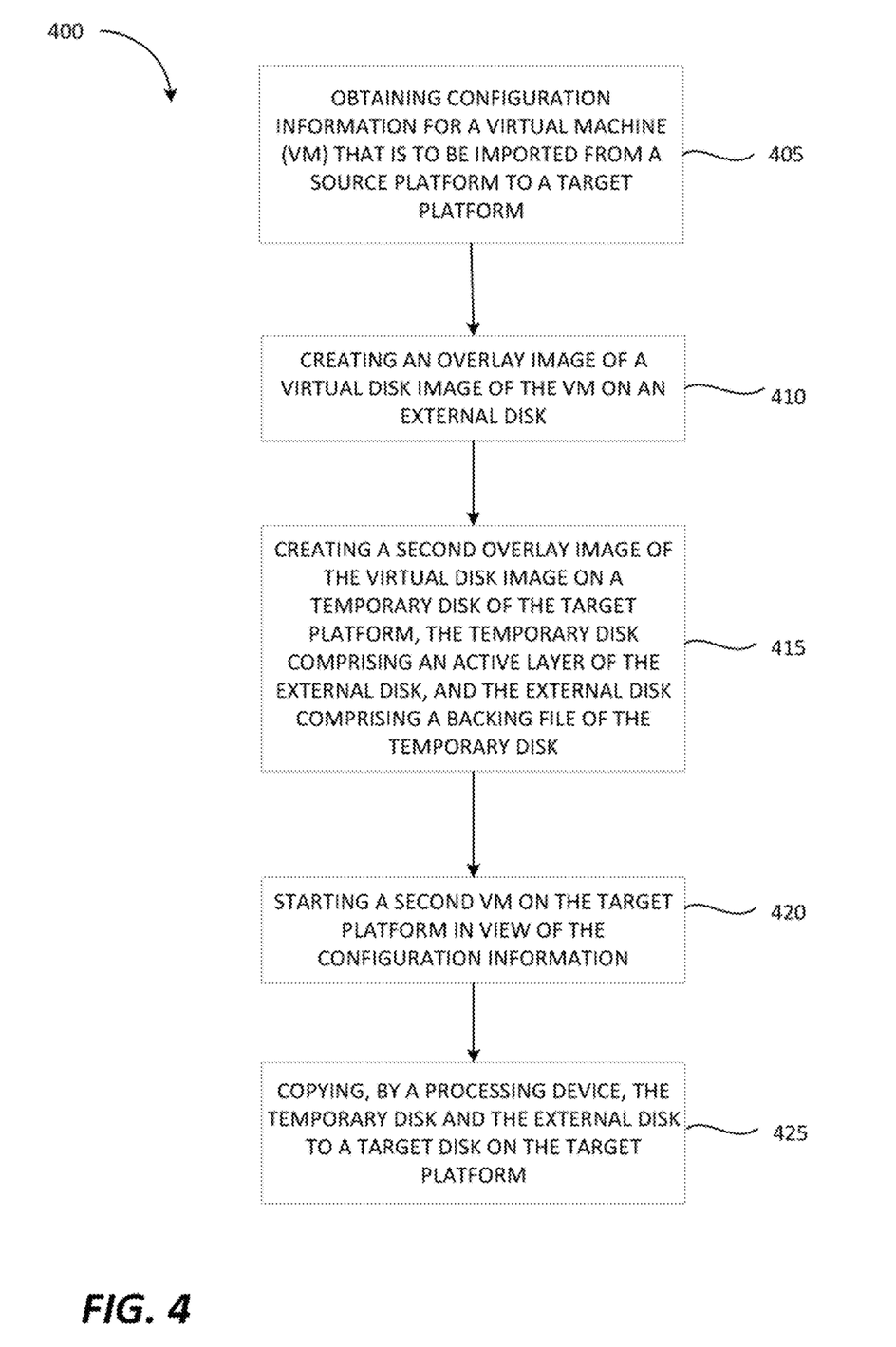
FIG. 4 is a flow diagram of an example method of migrating a virtual machine, in accordance with some embodiments of the present disclosure.

Method 400 is a flow diagram of a method 400 of migrating a VM while minimizing downtime, in accordance with some embodiments. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by a computing device (e.g., computing device 120 illustrated in FIG. 3A).

With reference to FIG. 3A as well as FIG. 4, computing device 120 may wish to migrate (import) VM 113 from computing device 110. Computing device 120 may include storage domain 120A which may comprise a block device or a file system based storage system as discussed herein with respect to storage domain 133. Computing device 120 may create temporary disk 240 on storage domain 120A. Temporary disk 240 may be empty upon its creation and may act as a placeholder for use by a VM in reading and/or writing data, as discussed in further detail herein.

The method 400 begins at block 405, where computing device 120 may issue a request to migrate VM 113 to computing device 110 and may obtain configuration information for the VM 113 that it wishes to import. External disk 133A may be a virtual disk in storage domain 133 that is accessed by hypervisor 212 externally and may connect to hypervisor 212 in any appropriate manner (e.g., iSCSI if storage domain 133 is a SAN). Responsive to a request from computing device 120 to migrate VM 113 thereto, computing device 110 may transmit the configuration information of VM 113 to computing device 120 and stop execution of the VM 113. At block 410, computing device 110 may create (e.g., using the qemu-img tool) an overlay image 133B of VDI 213A on external disk 133A. As discussed above, the overlay image 133B may be the next link in the backing chain of VDI 213A and may be created on the external disk 133A located in the storage domain 133 on computing device 130. QCOW2 supports creation of overlay images in a variety of ways. For example, if storage domain 133 is a block device based storage (with computing device 130 being an NBD server), computing device 110 may create the overlay image, and export it as a read only device to computing device 130 using (e.g.) the qemu-nbd command and specifying the URL of the path to the logical volume of storage domain 133 where external disk 133A is located. Depending on how storage domain 133 is implemented, the external disk 133A may be identified by a path of a file in a file system or a logical volume of a block device system in any appropriate manner as discussed herein. In some embodiments, external disk 133A may be located on a local storage domain attached directly to hypervisor 212 (e.g. storage domain 213).

Once the overlay image 133B has been exported to the external disk 133A, the external disk 133A may include all of the data of the VDI 213A but may be read from as well. At block 415, computing device 130 may create (e.g., using the qemu-img tool) a second overlay image 240A on temporary disk 240 in storage domain 120A. The second overlay image 240A may point to external disk 133A as the backing file for temporary disk 240 and the temporary disk 240 may become the active layer of external disk 133A. The second overlay image 240A may be created on temporary disk 240 as discussed above with respect to the first overlay image (e.g., may be exported to storage domain 120A of computing device 120 using the qemu-nbd command by specifying a URL of the path to the logical volume or file in storage domain 120A where temporary disk 240 is located).

At block 420, computing device 120 may use the configuration information of the VM 113 obtained from computing device 110 to create a second VM (VM 113A) which may be a copy of VM 113 and begin running VM 113A using temporary disk 240. When the VM 113A needs to read or write data, it may utilize temporary disk 240 (the active layer of external disk 133A) created in the storage domain 120A of computing device 120. VM 113A may communicate with temporary disk 240 in the same manner that VM 113 communicates with VDI 213A as discussed above. VM 113A may run with a limited set of data because the data in external disk 133A has not yet been copied to computing device 120. Thus, if the VM 113A requests to read data that is not stored on the temporary disk 240, VM 113A may read that data from external disk 133A on computing device 130.

In addition, if the data is not on the external disk 133A, it may be read from VDI 213A.

Once the VM 113A has begun running, at block 425, computing device 120 may copy temporary disk 240 and the external disk 133A to the target disk 245 in storage domain 120A. More specifically, computing device 120 may initiate a storage migration process to fully migrate external disk 133A (including the operating system, application software and other data files of VM 113) and the temporary disk 240 to the target disk 245 of computing device 120 for use by VM 113A. For example, computing device 120 may use live storage migration, in which virtual machine disks can be migrated from one storage domain to another while the virtual machine to which they are attached (in the example of FIG. 3A, VM 113A) is running. When a disk attached to a running virtual machine is migrated, a snapshot of that disk's backing chain is created in the source storage domain (in this case storage domain 133), and the entire backing chain is replicated in the destination storage domain (in this case, target disk 245 in storage domain 120A). Thus, the VM 113A may remain active and user applications may continue to run thereon while external disk 133A and the temporary disk 240 are migrated to the target disk 245 on computing device 120 (the new physical host) for use by VM 113A. Computing device 120 may perform this live migration in the background during operation of VM 113A.

Figure 5:
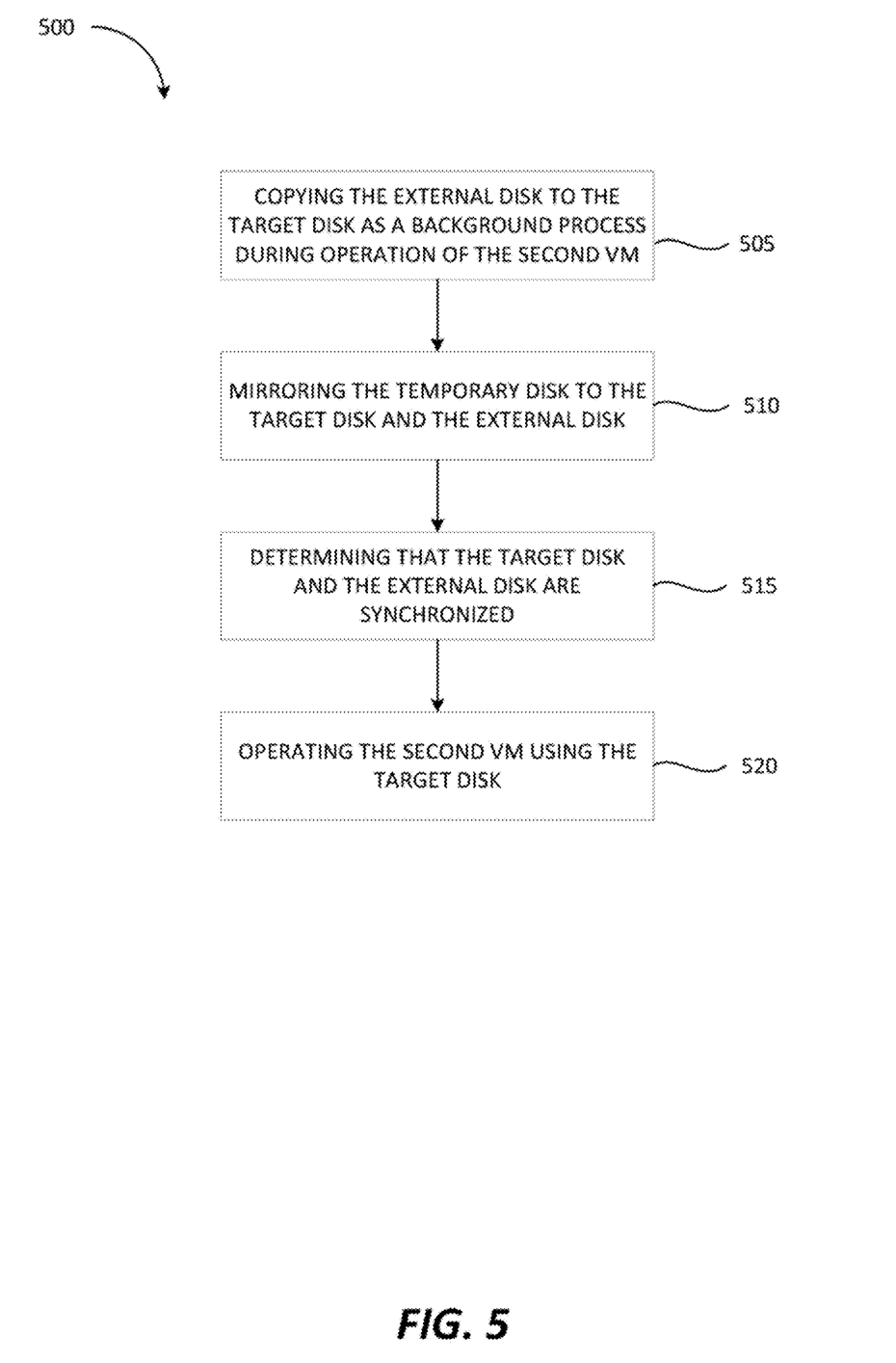
FIG. 5 is a flow diagram of an example method for live migrating a backing chain, in accordance with some embodiments of the present disclosure.

FIG. 5 is a flow diagram of a method 500 of live migrating a backing chain, in accordance with some embodiments. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 500 may be performed by a computing device (e.g., computing device 120 illustrated in FIG. 3A).

The method 500 begins at block 505, where computing device 120 may copy the contents of external disk 133A to target disk 245 as a background operation and simultaneously copy the contents of external disk 133A to target disk 245. Once the copy process is complete for both the temporary disk 240 and the external disk 133A, at block 510 computing device 120 may mirror outstanding write operations to both the temporary disk 240 and the target disk 245. Stated differently, write operations performed by VM 113A after the copying may be written to both the temporary disk 240 and the target disk 245, as this allows any outstanding write operations to be completed. At block 515, computing device 120 may determine that the temporary disk 240 and the target disk 245 are synchronized and at block 520 computing device 120 may switch the VM 113A from operation using the temporary disk 240 to operation using the target disk 245, and the external disk 133A may be deleted.

In some embodiments, because live storage migration may only occur between two file-based domains (NFS, POSIX, and GlusterFS) or between two block-based domains (FCP and iSCSI), computing device 120 may convert the format of the external disk 133A to the format of the target disk 245 using any appropriate tools. For example, if the external disk 133A is in a QCOW2 format and the target disk 245 is in a RAW format, computing device 120 may convert the external disk 133A to the RAW format.

In some embodiments, hypervisor 212 on which VM 113 runs may be a foreign hypervisor (e.g., VMware™ hypervisor) that is different from hypervisor 214 (e.g., KVM hypervisor) on computing device 120. In such a case, when a request to migrate a VM 113 is received, the VM 113 from foreign hypervisor 212 may be converted to run on hypervisor 214 of computing device 120. Computing device 120 may use any appropriate tool such as virt-v2v to convert foreign VMs including their disk images and metadata for use with hypervisor 214 on any appropriate system (e.g., Red Hat™ Enterprise Linux™ operating system with KVM hypervisor, Red Hat™ Virtualization environment, and Red Hat™ OpenStack™ Platform). In this manner, computing device 120 can read Linux and Windows guest VMs running on a VMware™ hypervisor, Xen™ hypervisor, Hyper-V™ hypervisor or any other appropriate hypervisor, and convert them to VMs of hypervisor 214 of computing device 120 (e.g., KVM hypervisor). During the conversion process, computing device 120 may convert the guest disks and metadata into a local temporary directory which may act as the external disk 133A. Stated differently, for each guest disk, an overlay is stored temporarily that stores the changes made during conversion, and is used as a cache. For example, the temporary overlay may be written to external disk 133A which in the example of FIG. 3B, is a virtual disk on storage domain 213.

Computing devices 110 and 120 may then perform the operations described above with respect to FIG. 3A to migrate the VM 113 to computing device 120 successfully.

Figure 6:
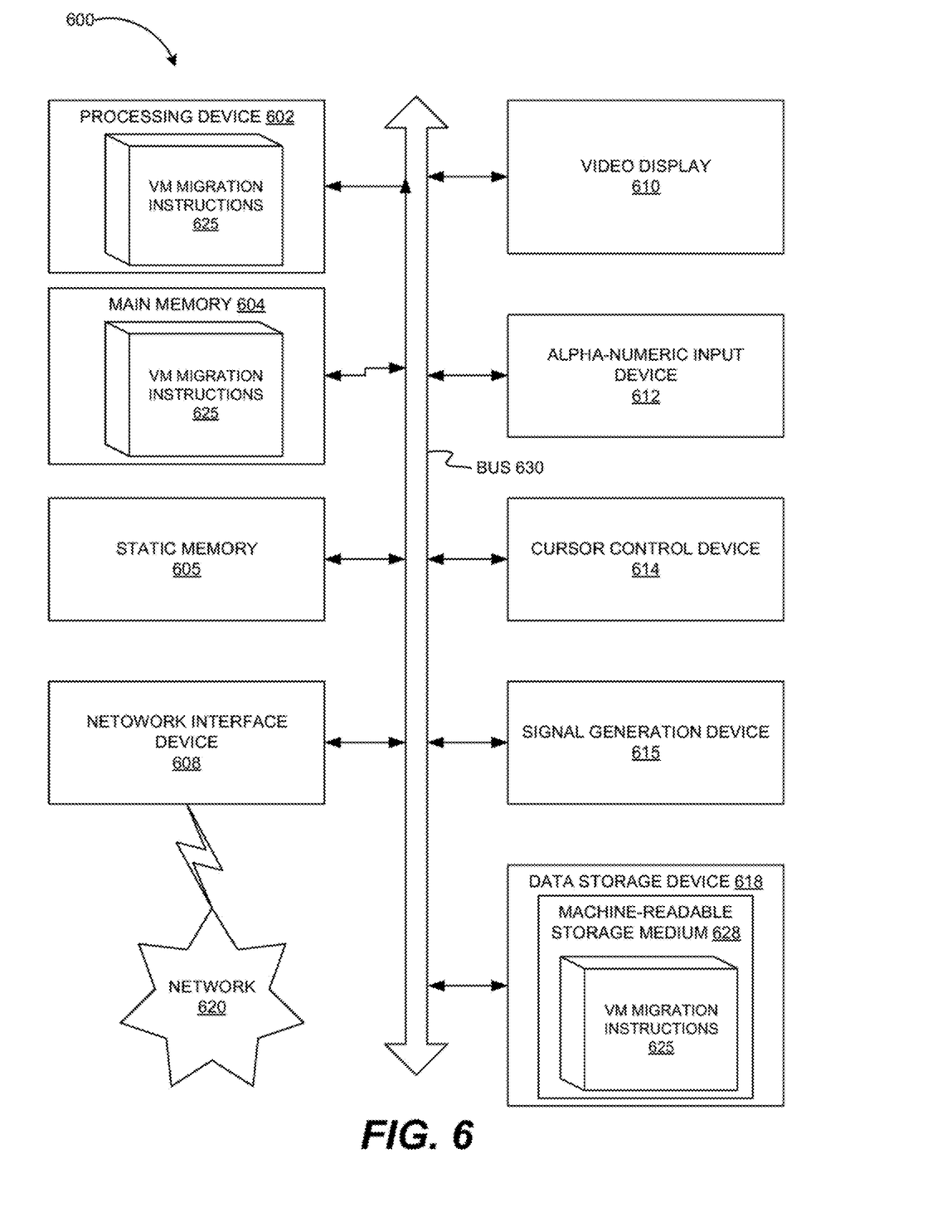
FIG. 6 is a block diagram of an example apparatus that may perform one or more of the operations described herein, in accordance with some embodiments of the present disclosure.

FIG. 6 is a block diagram of an example computing device 600 that may perform one or more of the operations described herein, in accordance with some embodiments. For example, computing deice 600 may migrate a VM by obtaining configuration information for a virtual machine (VM) that is to be imported from a source platform to a target platform, creating an overlay image of a virtual disk image of the VM on an external disk, creating a second overlay image of the virtual disk image on a temporary disk of the target platform, the temporary disk comprising an active layer of the virtual disk image, and the external disk comprising a backing file of the temporary disk, starting a second VM on the target platform in view of the configuration information and copy the temporary disk and the external disk to a target disk on the target platform.

Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 502, a main memory 604 (e.g., synchronous dynamic random access memory (DRAM), read-only memory (ROM)), a static memory 606 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also comprise one or more special-purpose processing devices such as an application specific integrated circuit (ASIC), a field programmable gate array (FPGA), a digital signal processor (DSP), network processor, or the like. The processing device 602 may be configured to execute the operations described herein, in accordance with one or more aspects of the present disclosure, for performing the operations and steps discussed herein.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 512 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of instructions, e.g., VM migration instructions 625 for carrying out the operations described herein, in accordance with one or more aspects of the present disclosure. Instructions implementing module 626 may also reside, completely or at least partially, within main memory 604 and/or within processing device 602 during execution thereof by computing device 600, main memory 604 and processing device 602 also constituting computer-readable media. The VM migration instructions 625 may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Example 1 is a method, comprising: obtaining configuration information for a virtual machine (VM) that is to be imported from a source platform to a target platform, creating an overlay image of a virtual disk image of the VM on an external disk, creating a second overlay image of the virtual disk image on a temporary disk of the target platform, the temporary disk comprising an active layer of the external disk, and the external disk comprising a backing file of the temporary disk, starting a second VM on the target platform in view of the configuration information and copying, by a processing device, the temporary disk and the external disk to a target disk on the target platform.

Example 2 is the method of Example 1, wherein the second VM performs read and write operations using the temporary disk until the temporary disk and the external disk are copied to the target disk.

Example 3 is the method of Example 2, wherein copying the temporary disk and the external disk to the target disk comprises: copying the external disk to the target disk as a background process during operation of the second VM; mirroring outstanding write operations to the target disk and the temporary disk; determining that the target disk and the temporary disk are synchronized; and operating the second VM using the target disk.

Example 4 is the method of Example 1, wherein copying the temporary disk and the external disk to the target disk comprises converting a current format of the external disk to a format of the target disk.

Example 5 is the method of Example 1, further comprising converting the VM from a first format associated with a hypervisor of the source platform to a second format associated with a hypervisor of the target platform.

Example 6 is the method of Example 1, further comprising: responsive to a request from the second VM to read data, determining whether the data is stored in the temporary disk, and if not, reading the data from the external disk, and if so, reading the data from the temporary disk.

Example 7 is the method of Example 1, wherein the external disk comprises a logical volume on a block device storage domain.

Example 8 is a system, comprising: a memory to store a virtual disk image of a virtual machine (VM) that is to be imported from a source platform to a target platform and a processing device coupled to the memory, the processing device to: obtain configuration information for the VM, cease operation of the VM, create an overlay image of the virtual disk image of the VM on an external disk, create a second overlay image of the virtual disk image on a temporary disk of the target platform, the temporary disk comprising an active layer of the external disk, and the external disk comprising a backing file of the temporary disk, start a second VM on the target platform in view of the configuration information, wherein the second VM performs read and write operations using the temporary disk; and copy the temporary disk and the external disk to a target disk on the target platform.

Example 9 is the system of Example 8, wherein the second VM performs read and write operations using the temporary disk until the temporary disk and the external disk are copied to the target disk.

Example 10 is the system of Example 9, wherein to copy the temporary disk and the external disk to the target disk, the processing device is to: copy the external disk to the target disk as a background process during operation of the second VM, mirror outstanding write operations to the target disk and the temporary disk, determine that the target disk and the temporary disk are synchronized and operate the second VM using the target disk.

Example 11 is the system of Example 8, wherein to copy the temporary disk and the external disk to the target disk, the processing device is to convert a current format of the external disk to a format of the target disk.

Example 12 is the system of Example 8, wherein the processing device is further to: convert the VM from a first format associated with a hypervisor of the source platform to a second format associated with a hypervisor of the target platform.

Example 13 is the system of Example 8, wherein the processing device is further to: responsive to a request from the second VM to read data, determine whether the data is stored in the temporary disk, and if not, read the data from the external disk and if so, read the data from the temporary disk.

Example 14 is the system of Example 8, wherein the external disk comprises a logical volume on a block device storage domain.

Example 15 is a non-transitory computer-readable storage medium including instructions that, when executed by a processing device of a source host system, cause the processing device to: convert a format of a VM associated with a hypervisor of a source platform to a second format associated with a hypervisor of a target platform, the VM to be imported from the source platform to the target platform, create an overlay image of a virtual disk image of the VM on an external disk, the overlay image recording changes made by the VM during the converting, obtain configuration information of the VM, create a second overlay image of the virtual disk image on a temporary disk of the target platform, the temporary disk comprising an active layer of the external disk, and the external disk comprising a backing file of the temporary disk, start a second VM on the target platform in view of the configuration information and copy, by the processing device, the temporary disk and the external disk to a target disk on the target platform.

Example 16 is the non-transitory computer-readable storage medium of Example 15, wherein the second VM performs read and write operations using the temporary disk until the temporary disk and the external disk are copied to the target disk.

Example 17 is the non-transitory computer-readable storage medium of Example 16, wherein to copy the temporary disk and the external disk to the target disk, the processing device is to: copy the external disk to the target disk as a background process during operation of the second VM, mirror outstanding write operations to the target disk and the temporary disk, determine that the target disk and the temporary disk are synchronized and operate the second VM using the target disk.

Example 18 is the non-transitory computer-readable storage medium of Example 15, wherein to copy the temporary disk and the external disk to the target disk, the processing device is to convert a current format of the external disk to a format of the target disk.

Example 19 is the non-transitory computer-readable storage medium of Example 15, wherein the processing device is further to: convert the VM from a first format associated with a hypervisor of the source platform to a second format associated with a hypervisor of the target platform.

Example 20 is the non-transitory computer-readable storage medium of Example 15, wherein the processing device is further to: responsive to a request from the second VM to read data, determine whether the data is stored in the temporary disk, and if not, read the data from the external disk, and if so, read the data from the temporary disk.

Example 21 is the non-transitory computer-readable storage medium of Example 15, wherein the external disk comprises a logical volume on a block device storage domain.

Example 22 is a method comprising: converting a format of a VM associated with a hypervisor of a source platform to a second format associated with a hypervisor of a target platform, the VM to be imported from the source platform to the target platform, creating an overlay image of a virtual disk image of the VM on an external disk, the overlay image recording changes made by the VM during the converting, obtaining configuration information for the VM, creating a second overlay image of the virtual disk image on a temporary disk of the target platform, the temporary disk comprising an active layer of the virtual disk image, and the external disk comprising a backing file of the temporary disk, starting a second VM on the target platform in view of the configuration information; and copying, by a processing device, the temporary disk and the external disk to a target disk on the target platform.

Example 23 is the method of Example 22, wherein the second VM performs read and write operations using the temporary disk.

Example 24 is the method of Example 23, wherein copying the temporary disk and the external disk to the target disk comprises: copying the external disk to the target disk as a background process during operation of the second VM, mirroring outstanding write operations to the target disk and the temporary disk, determining that the target disk and the temporary disk are synchronized, and operating the second VM using the target disk.

Example 25 is the method of Example 22, wherein copying the temporary disk and the external disk to the target disk comprises converting a current format of the external disk to a format of the target disk.

Example 26 is the method of Example 22, further comprising: converting the VM from a first format associated with a hypervisor of the source platform to a second format associated with a hypervisor of the target platform.

Example 27 is the method of Example 22, further comprising: responsive to a request from the second VM to read data, determining whether the data is stored in the temporary disk, and if not, reading the data from the external disk, and if so, reading the data from the temporary disk.

Example 28 is the method of Example 22, wherein the external disk comprises a logical volume on a block device storage domain.

Example 29 is the method of Example 22, wherein the external disk comprises a file on a file system storage domain.

Example 30 is an apparatus comprising: means for obtaining configuration information for a virtual machine (VM) that is to be imported from a source platform to a target platform, creating an overlay image of a virtual disk image of the VM on an external disk, and creating a second overlay image of the virtual disk image on a temporary disk of the target platform, the temporary disk comprising an active layer of the virtual disk image, and the external disk comprising a backing file of the temporary disk, and means for: starting a second VM on the target platform in view of the configuration information, and copying, by a processing device, the temporary disk and the external disk to a target disk on the target platform.

Example 31 is the apparatus of Example 30, wherein the second VM performs read and write operations using the temporary disk until the temporary disk and the external disk are copied to the target disk.

Example 32 is the apparatus of Example 31, wherein copying the temporary disk and the external disk to the target disk comprises: copying the external disk to the target disk as a background process during operation of the second VM, mirroring outstanding write operations to the target disk and the temporary disk, determining that the target disk and the temporary disk are synchronized and operating the second VM using the target disk.

Example 33 is the apparatus of Example 30, wherein copying the temporary disk and the external disk to the target disk comprises converting a current format of the external disk to a format of the target disk.

Example 34 is the apparatus of Example 30, further comprising means for converting the VM from a first format associated with a hypervisor of the source platform to a second format associated with a hypervisor of the target platform.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to"

perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
    obtaining configuration information for a virtual machine (VM) that is to be imported from a source platform to a target platform;
    creating an overlay image of a virtual disk image of the VM on an external disk located on a storage domain that is separate from the source platform;
    creating a temporary disk on the target platform;
    creating a second overlay image of the virtual disk image on the temporary disk of the target platform, the temporary disk comprising an active layer of the external disk, and the external disk comprising a backing file of the temporary disk;
    starting a second VM on the target platform in view of the configuration information; and
    copying, by a processing device, contents of the temporary disk and the external disk to a target disk on the target platform, wherein the contents of the temporary disk correspond to operations performed by the second VM.

2. The method of claim 1, wherein the second VM performs read and write operations using the temporary disk until the temporary disk and the external disk are copied to the target disk.

3. The method of claim 2, wherein copying the temporary disk and the external disk to the target disk comprises:
    copying the external disk to the target disk as a background process during operation of the second VM;
    mirroring outstanding write operations to the target disk and the temporary disk;
    determining that the target disk and the temporary disk are synchronized; and
    operating the second VM using the target disk.

4. The method of claim 1, wherein copying the temporary disk and the external disk to the target disk comprises converting a current format of the external disk to a format of the target disk.

5. The method of claim 1, further comprising:
    converting the VM from a first format associated with a hypervisor of the source platform to a second format associated with a hypervisor of the target platform.

6. The method of claim 1, further comprising:
    responsive to a request from the second VM to read data, determining whether the data is stored in the temporary disk, and if not, reading the data from the external disk, and if so, reading the data from the temporary disk.

7. The method of claim 1, wherein the storage domain comprises a block device storage domain and the external disk comprises a logical volume on the block device storage domain.

8. A system comprising:
    a memory to store a virtual disk image of a source virtual machine (VM) that is to be imported from a source platform to a target platform; and
    a processing device operatively coupled to the memory, the processing device to:
        obtain configuration information for the source VM;
        cease operation of the source VM;
        create an overlay image of the virtual disk image of the source VM on an external disk located on a storage domain that is separate from the source platform;
    create a temporary disk on the target platform;
        create a second overlay image of the virtual disk image on the temporary disk of the target platform, the temporary disk comprising an active layer of the external disk, and the external disk comprising a backing file of the temporary disk;
        start a target VM on the target platform in view of the configuration information, wherein the target VM performs read and write operations using the temporary disk; and
        copy contents of the temporary disk and the external disk to a target disk on the target platform, wherein the contents of the temporary disk correspond to the read and write operations performed by the target VM.

9. The system of claim 8, wherein the target VM performs the read and write operations using the temporary disk until the temporary disk and the external disk are copied to the target disk.

10. The system of claim 9, wherein to copy the temporary disk and the external disk to the target disk, the processing device is to:
    copy the external disk to the target disk as a background process during operation of the target VM;
    mirror outstanding write operations to the target disk and the temporary disk;

determine that the target disk and the temporary disk are synchronized; and operate the target VM using the target disk.

11. The system of claim 8, wherein to copy the temporary disk and the external disk to the target disk, the processing device is to convert a current format of the external disk to a format of the target disk.

12. The system of claim 8, wherein the processing device is further to:

convert the source VM from a first format associated with a hypervisor of the source platform to a second format associated with a hypervisor of the target platform.

13. The system of claim 8, wherein the processing device is further to:

responsive to a request from the target VM to read data, determine whether the data is stored in the temporary disk, and if not, read the data from the external disk and if so, read the data from the temporary disk.

14. The system of claim 8, wherein the storage domain comprises a block device storage domain and the external disk comprises a logical volume on the block device storage domain.

15. A non-transitory computer-readable storage medium including instructions that, when executed by a processing device of a source host system, cause the processing device to:

convert a format of a VM associated with a hypervisor of a source platform to a second format associated with a hypervisor of a target platform, the VM to be imported from the source platform to the target platform;

create an overlay image of a virtual disk image of the VM on an external disk located on a storage domain that is separate from the source platform, the overlay image recording changes made by the VM during the converting;

obtain configuration information for the VM;

create a temporary disk on the target platform;

create a second overlay image of the virtual disk image on the temporary disk of the target platform, the temporary disk comprising an active layer of the external disk, and the external disk comprising a backing file of the temporary disk;

start a second VM on the target platform in view of the configuration information; and copy, by the processing device, contents of the temporary disk and the external disk to a target disk on the target platform, wherein the contents of the temporary disk correspond to operations performed by the second VM.

16. The non-transitory computer-readable storage medium of claim 15, wherein the second VM performs read and write operations using the temporary disk until the temporary disk and the external disk are copied to the target disk.

17. The non-transitory computer-readable storage medium of claim 16, wherein to copy the temporary disk and the external disk to the target disk, the processing device is to:

copy the external disk to the target disk as a background process during operation of the second VM;

mirror outstanding write operations to the target disk and the temporary disk;

determine that the target disk and the temporary disk are synchronized; and operate the second VM using the target disk.

18. The non-transitory computer-readable storage medium of claim 15, wherein to copy the temporary disk and the external disk to the target disk, the processing device is to convert a current format of the external disk to a format of the target disk.

19. The non-transitory computer-readable storage medium of claim 15, wherein the storage domain comprises a block device storage domain and the external disk comprises a logical volume on the block device storage domain.

20. The non-transitory computer-readable storage medium of claim 15, wherein the processing device is further to:

responsive to a request from the second VM to read data, determine whether the data is stored in the temporary disk, and if not, read the data from the external disk and if so, read the data from the temporary disk.

* * * * *